United States Patent
Junaedi et al.

(10) Patent No.: US 11,581,553 B2
(45) Date of Patent: Feb. 14, 2023

(54) REGENERATIVE SOLID OXIDE STACK

(71) Applicant: PRECISION COMBUSTION, INC., North Haven, CT (US)

(72) Inventors: Christian Junaedi, Cheshire, CT (US); Subir Roychoudhury, Madison, CT (US); Kyle Hawley, Woodbury, CT (US); Saurabh Vilekar, Woodbridge, CT (US)

(73) Assignee: Precision Combustion, Inc., North Haven, CT (US)

( * ) Notice: Subject to any disclaimer, the term of this patent is extended or adjusted under 35 U.S.C. 154(b) by 29 days.

(21) Appl. No.: 17/193,054

(22) Filed: Mar. 5, 2021

(65) Prior Publication Data
US 2021/0202964 A1 Jul. 1, 2021

Related U.S. Application Data

(63) Continuation of application No. 16/336,137, filed as application No. PCT/US2017/000068 on Oct. 16, 2017, now Pat. No. 10,978,722.
(Continued)

(51) Int. Cl.
*H01M 8/04007* (2016.01)
*C25B 15/02* (2021.01)
(Continued)

(52) U.S. Cl.
CPC .......... *H01M 8/04037* (2013.01); *C25B 1/00* (2013.01); *C25B 1/04* (2013.01); *C25B 9/19* (2021.01);
(Continued)

(58) Field of Classification Search
CPC .. C25B 1/00; C25B 1/04; C25B 11/00; C25B 15/02; C25B 15/08; C25B 9/19;
(Continued)

(56) References Cited

U.S. PATENT DOCUMENTS

| 4,647,516 A | 3/1987 | Matsumura |
| 5,051,241 A | 9/1991 | Pfefferle |

(Continued)

FOREIGN PATENT DOCUMENTS

| EP | 1617501 A2 | 1/2006 |
| WO | WO2005011019 A2 | 2/2005 |

(Continued)

OTHER PUBLICATIONS

Copending U.S. Appl. No. 16/336,146, filed Mar. 25, 2019, Now Allowed, entitled "Solid Oxide Fuel Cell with Internal Reformer," Precision Combustion, Inc.; (National filing of WO 2018/080570A1).

(Continued)

*Primary Examiner* — Victoria H Lynch
(74) *Attorney, Agent, or Firm* — Marie Zuckerman; Andrew D. Gathy

(57) ABSTRACT

An individual solid oxide cell (SOC) constructed of a sandwich configuration including in the following order: an oxygen electrode, a solid oxide electrolyte, a fuel electrode, a fuel manifold, and at least one layer of mesh. In one embodiment, the mesh supports a reforming catalyst resulting in a solid oxide fuel cell (SOFC) having a reformer embedded therein. The reformer-modified SOFC functions internally to steam reform or partially oxidize a gaseous hydrocarbon, e.g. methane, to a gaseous reformate of hydrogen and carbon monoxide, which is converted in the SOC to water, carbon dioxide, or a mixture thereof, and an electrical current. In another embodiment, an electrical insulator is disposed between the fuel manifold and the mesh resulting in a solid oxide electrolysis cell (SOEC), which functions to electrolyze water and/or carbon dioxide.

3 Claims, 7 Drawing Sheets

Related U.S. Application Data

(60) Provisional application No. 62/411,792, filed on Oct. 24, 2016.

(51) Int. Cl.

| | | |
|---|---|---|
| *C25B 15/08* | (2006.01) | |
| *H01M 8/0612* | (2016.01) | |
| *H01M 8/12* | (2016.01) | |
| *H01M 8/18* | (2006.01) | |
| *C25B 1/00* | (2021.01) | |
| *H01M 8/2483* | (2016.01) | |
| *H01M 8/0258* | (2016.01) | |
| *H01M 8/2425* | (2016.01) | |
| *C25B 1/04* | (2021.01) | |
| *C25B 9/19* | (2021.01) | |
| *C25B 9/70* | (2021.01) | |
| *C25B 9/77* | (2021.01) | |
| *C25B 11/00* | (2021.01) | |

(52) U.S. Cl.
CPC ................ *C25B 9/70* (2021.01); *C25B 9/77* (2021.01); *C25B 11/00* (2013.01); *C25B 15/02* (2013.01); *C25B 15/08* (2013.01); *H01M 8/0258* (2013.01); *H01M 8/0625* (2013.01); *H01M 8/0631* (2013.01); *H01M 8/12* (2013.01); *H01M 8/184* (2013.01); *H01M 8/2425* (2013.01); *H01M 8/2483* (2016.02); *H01M 2008/1293* (2013.01); *Y02E 60/36* (2013.01); *Y02E 60/50* (2013.01)

(58) Field of Classification Search
CPC .... C25B 9/70; C25B 9/77; H01M 2008/1293; H01M 8/0258; H01M 8/04037; H01M 8/0625; H01M 8/0631; H01M 8/12; H01M 8/184; H01M 8/2425; H01M 8/2483; Y02E 60/36; Y02E 60/50
See application file for complete search history.

(56) References Cited

U.S. PATENT DOCUMENTS

| | | |
|---|---|---|
| 5,348,814 A | 9/1994 | Niikura |
| 6,051,329 A | 4/2000 | Fasano |
| 6,156,444 A | 12/2000 | Smith |
| 6,328,936 B1 | 12/2001 | Roychoudhury |
| 6,444,340 B1 | 9/2002 | Jaffrey |
| 6,492,050 B1 | 12/2002 | Sammes |
| 7,141,092 B1 | 11/2006 | Roychoudhury |
| 7,422,818 B2 | 9/2008 | Finkenwirth |
| 7,504,047 B2 | 3/2009 | Castaldi |
| 7,691,521 B2 | 4/2010 | Ahmed |
| 7,993,785 B2 | 8/2011 | Jankowski |
| 8,304,128 B2 | 11/2012 | Hendriksen |
| 8,652,709 B2 | 2/2014 | Carter |
| 8,709,674 B2 | 4/2014 | Sarkar |
| 9,199,846 B2 | 12/2015 | Roychoudhury |
| 9,263,758 B2 | 2/2016 | Larsen |
| 2002/0132145 A1 | 9/2002 | Preidel |
| 2003/0077504 A1 | 4/2003 | Hara |
| 2003/0232230 A1 | 12/2003 | Carter |
| 2005/0170234 A1 | 8/2005 | Liu |
| 2005/0196657 A1 | 9/2005 | Sarkar |
| 2005/0202159 A1 | 9/2005 | Svoboda |
| 2007/0015015 A1 | 1/2007 | Hoshino |
| 2009/0023050 A1 | 1/2009 | Finnerty |
| 2011/0039183 A1 | 2/2011 | Armstrong |
| 2012/0021314 A1 | 1/2012 | Crumm |
| 2016/0006047 A1 | 1/2016 | Pedersen |
| 2019/0006690 A1 | 1/2019 | Louis |

FOREIGN PATENT DOCUMENTS

| | | |
|---|---|---|
| WO | WO2014139822 A1 | 9/2014 |
| WO | WO2018080570 A1 | 5/2018 |
| WO | WO2018080571 A1 | 5/2018 |

OTHER PUBLICATIONS

Copending U.S. Appl. No. 16/336,158, filed Mar. 25, 2019, entitled "Solid Oxide Electrolysis with Internal Heater," Precision Combustion, Inc.; (National filing of WO 2018/080571A1).

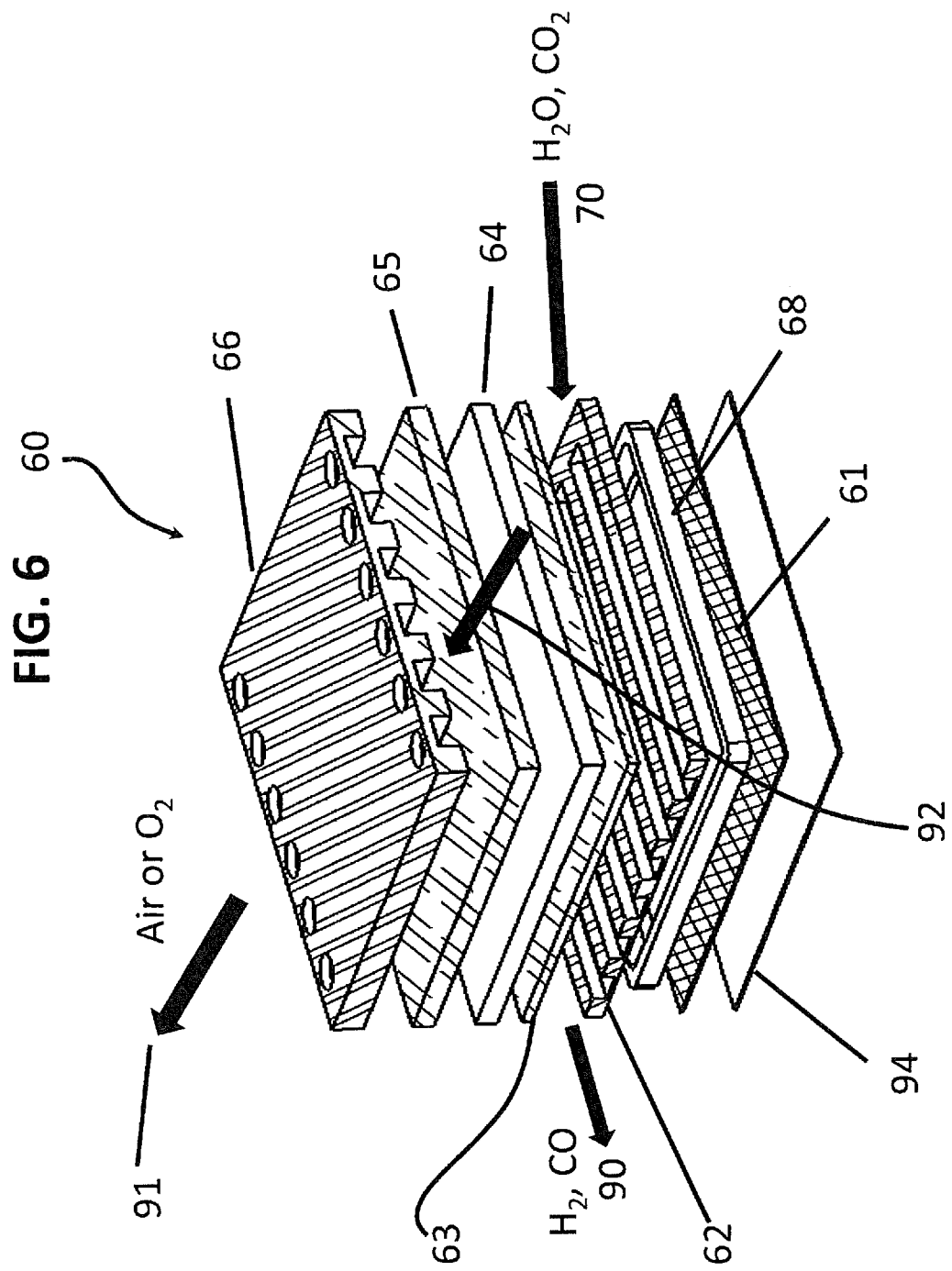

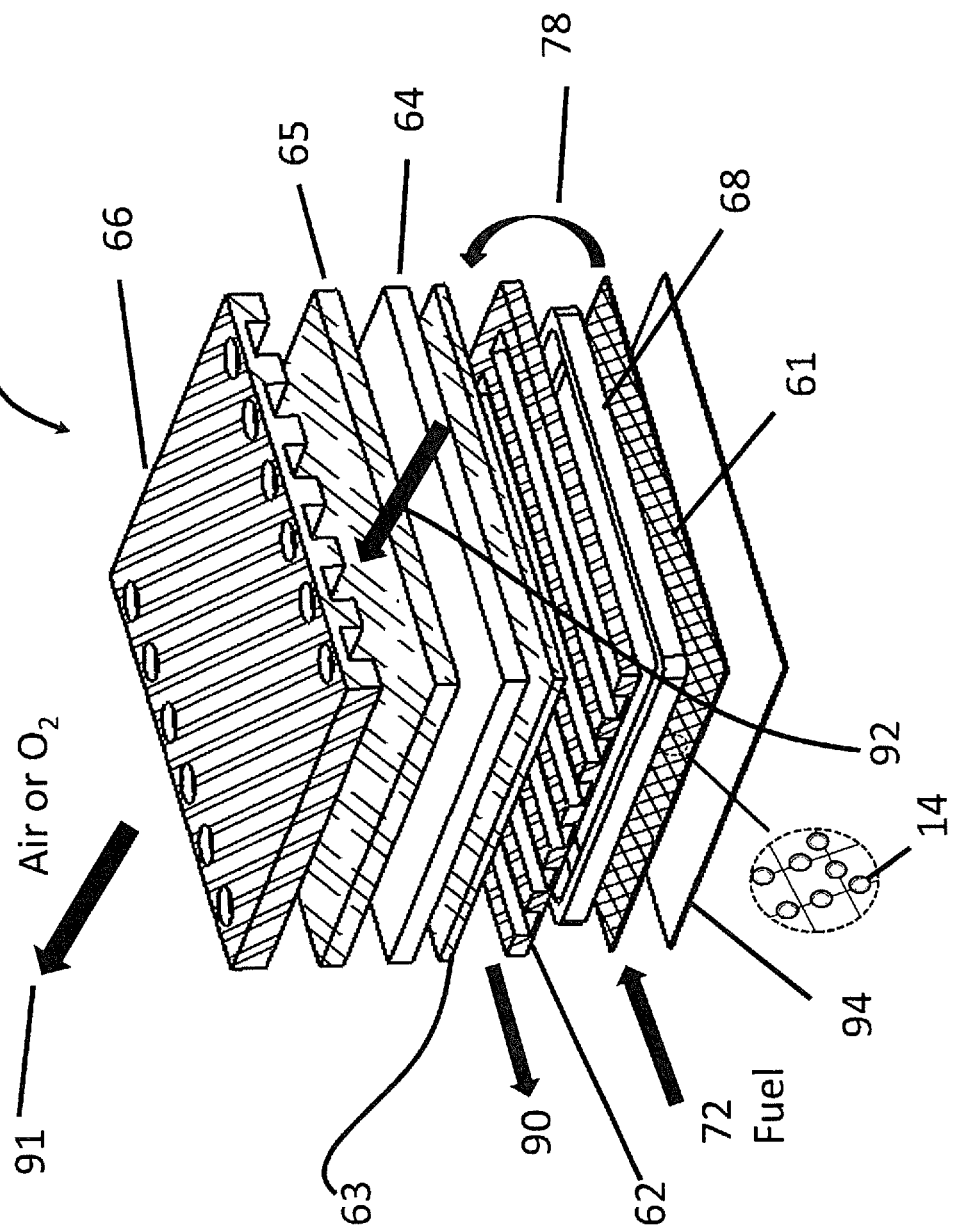

REGENERATIVE SOLID OXIDE STACK

CROSS REFERENCE TO RELATED APPLICATIONS

This application is a continuation of U.S. patent application Ser. No. 16/336,137, filed on Mar. 25, 2019, which is a 371 filing of International patent application PCT/US2017/000068, filed Oct. 16, 2017, which claims the benefit of U.S. provisional patent application No. 62/411,792, filed Oct. 24, 2016, all applications being incorporated in their entirety herein by reference.

GOVERNMENT RIGHTS

This invention was made with U.S. government support under Contract No. NNX15CC43P, awarded by the National Aeronautics and Space Administration. The U.S. Government has certain rights in the invention.

FIELD OF THE INVENTION

In one aspect, this invention pertains to a solid oxide cell ("SOC"), more particularly, to a solid oxide fuel cell ("SOFC") and to its reverse embodiment, a solid oxide electrolysis cell ("SOEC"). Even more particularly, this invention pertains to a solid oxide fuel cell having integrated therein a fuel reformer and to its reverse embodiment, a solid oxide electrolysis cell having integrated therein a heater. In another aspect, this invention pertains to a method of generating electricity in the solid oxide fuel cell having integrated therein the reformer. In yet another aspect, this invention pertains to a method of electrolyzing water, carbon dioxide or a mixture thereof in the solid oxide electrolysis cell having integrated therein the heater.

BACKGROUND OF THE INVENTION

As known in the art, the solid oxide cell ("SOC") is provided as a sandwich assembly having constituent parts in the following order a fuel electrode, a solid oxide electrolyte, and an oxygen electrode, the fuel and oxygen electrodes being connected via an external electrical circuit. The solid oxide cell is an apparatus that in forward operation provides for the electrochemical reaction of a fuel, such as hydrogen or carbon monoxide, with an oxidant, such as oxygen, to produce a DC electrical current and a chemical product, namely, water or carbon dioxide, respectively. The same apparatus in reverse or regenerative operation provides for the electrolysis of a fuel, namely water or carbon dioxide, to produce hydrogen and oxygen in the case of water, or alternatively, carbon monoxide and oxygen in the case of carbon dioxide.

In the SOFC, the fuel is typically provided to the fuel electrode where it reacts via oxidation with oxide ions to produce the oxidized product and a flow of electrons. The electrons travel via an embedded current collector and the external electrical circuit to the oxygen electrode where molecular oxygen is reduced to form the oxide ions. During transit the electrons are available to do useful work. The oxide ions produced at the oxygen electrode diffuse through the solid oxide electrolyte to the fuel electrode to complete the chemical reaction.

The solid oxide electrolyte typically comprises a ceramic that is a good conductor of oxide ions but a poor or nonconductor of electrons, which ensures that the electrons pass through the external circuit. As an example, the solid oxide electrolyte can be constructed of a ceramic comprising a yttria-stabilized zirconia (YSZ) sandwiched in between a fuel electrode comprised of a nickel oxide/YSZ cermet and an oxygen electrode comprised of a doped lanthanum manganite.

Since each individual SOFC produces only a small, generally low voltage, typically a large number of individual fuel cells are connected in series to form a stack for the purpose of achieving a higher voltage and current. Each fuel cell stack includes interconnects (or bipolar plates) that separate the individual fuel cells from each other as well as flow manifolds that deliver and distribute the flows of fuel and oxygen to their respective electrodes within the stack and remove products from the stack. For the purposes of this invention, the term "interconnect" is deemed equivalent to and interchangeable with the term "bipolar plate". Additionally, as used herein, the term "fuel interconnect" shall refer to an interconnect disposed on the fuel electrode side of the cell; whereas the term "oxygen interconnect" shall refer to an interconnect disposed on the oxygen electrode side of the cell. The interconnects can be constructed to provide dual functionality as flow manifolds. Additionally, each fuel cell includes a current collector at each electrode, either as a separate layer or as integrated into the associated interconnect. Each individual fuel cell in a stack is frequently referred to as a "fuel cell repeat unit".

It should be appreciated that in the aforementioned forward operation, the fuel to the SOFC is provided as gaseous hydrogen or gaseous carbon monoxide. Since gaseous hydrogen and carbon monoxide require pressurization and are not readily available as transport fuels, these gaseous fuels impose limitations on the size and portability of the fuel cell. To solve the problem of gaseous fuel delivery, the prior art discloses apparatuses wherein a fuel reformer is integrated with the fuel cell or stack, so as to convert in situ and on demand a readily-available hydrocarbon fuel into a gaseous reformate providing the hydrogen and carbon monoxide. Certain prior art, for example, U.S. Pat. No. 4,647,516, discloses a reforming catalyst in the form of pellets or particulates filled into channels or support structures that are disposed adjacent to the fuel electrode. Particulate catalysts are disadvantageously cumbersome, weighty and prone to attrition losses. Other prior art, for example, U.S. Pat. No. 6,051,329 and US application publication 2005/0170234, disclose a reforming catalyst that is coated onto or dispersed into the fuel electrode (referred to as the "anode") or onto an interconnect adjacent to the fuel electrode. The coated and dispersed designs placed directly on the interconnect and fuel electrode are difficult to manufacture. Additionally, both prior art designs have problems in that reforming capability often interferes with the expected capability of the fuel cell part; for example, the oxidation reaction at the fuel electrode or current collection at the interconnect is diminished. Moreover, coating the fuel electrode or interconnect with a reforming catalyst often diminishes reforming capability, which leads to poisoning of the reforming and fuel cell parts via coking.

It should be further appreciated that start-up of prior art solid oxide fuel cells undesirably involves a significant amount of time. Typically, a supply of preheated oxygen or air is fed to the cell to raise the cell slowly to its operating temperature of between 800° C. and 1,000° C. A flow of fuel is also started at a designated temperature, and SOFC operation commences and approaches steady state over time. Once the cell has reached its steady state operating temperature, withdrawal of heat is required to maintain safe operation and acceptable cell lifetime. Prior art solid oxide fuel cells lack rapid and efficient heat input and heat withdrawal mechanisms.

In regenerative SOEC operation, a fuel, such as water or carbon dioxide, is fed to the fuel electrode where the fuel is reduced with electrons delivered from an external current source provided to the cell, thereby producing hydrogen or carbon monoxide, respectively, and oxide ions. The oxide ions diffuse through the solid oxide electrolyte from the fuel electrode to the oxygen electrode, where electrons are released to produce oxygen gas. In this instance the electrons transit through the external circuit from the oxygen electrode to the fuel electrode.

Three operating modes are well-known for high temperature electrolysis: 1) thermoneutral, 2) endothermal, and 3) exothermal. High temperature electrolysis operates at thermal equilibrium when electrical energy input equals total energy demand, and theoretical electrical conversion efficiency is 100 percent. In the thermoneutral mode, the heat demand (Q) necessary for splitting water or carbon dioxide, calculated as a product of temperature (T) and change in entropy ($\Delta S$), equals heat released by joule heating (ohmic losses) within the cell. In the exothermal mode, the electric energy input exceeds the enthalpy of reaction corresponding to an electrical efficiency below 100 percent. In this mode, heat is generated from the cell and can be reused in the system to preheat the inlet water and/or carbon dioxide. This mode also has the advantage to operate at higher current density resulting in reduced system size; but may, however, lead to premature ageing of system components. Finally, in the endothermal mode the electric energy input stays below the enthalpy of reaction which means a cell voltage below the thermoneutral one. Therefore, heat must be supplied to the system to maintain the temperature.

The art discloses heaters disposed adjacent to one or more fuel cell stacks to provide the required heat input for SOEC operation. See, for example, International Patent Application publication WO 2014/139882. Generally, the disposition of the heaters in prior art apparatuses does not provide for uniform heating of each cell repeat unit in the stack. This can result in hot or cold spots in the stack that stress one part of the stack more than another and ultimately either degrade the stack or crack a single or multiple solid oxide cells within the stack.

The art would benefit from design improvements in solid oxide cell repeat units and stack assemblies having a reformer/heater unit integrated therewith. Improvements would desirably include a more rapid start-up of the SOFC/SOEC cell as well as more efficient heat input and heat withdrawal mechanisms, as compared with prior art designs. Other improvements would include employment of a more compact, higher efficiency and longer lifetime reformer that minimizes coking at the reformer and the fuel electrode. Yet other improvements would include operating at a lower peak fuel cell temperature and providing greater uniformity of temperature within the fuel cell stack, so as to improve the lifetime of the fuel cell.

It should be appreciated that any SOC system having a reformer integrated therein should minimize the size of the reformer. Even more importantly, the reformer should operate with a conversion efficiency greater than about 80 percent in a single pass in converting the hydrocarbon fuel to hydrogen and carbon monoxide, else the resulting reformate contains a disadvantageously high concentration of unconverted hydrocarbon, which at SOFC operating temperatures potentially cokes and critically damages the fuel electrode.

SUMMARY OF THE INVENTION

In one aspect, this invention provides for a solid oxide cell (SOC) comprising components disposed in a sandwich configuration in the following order:
(i) an oxygen electrode,
(ii) a solid oxide electrolyte,
(iii) a fuel electrode,
(iv) a fuel manifold, and
(v) at least one layer of mesh disposed adjacent to the fuel manifold, on a side of the fuel manifold opposite a side facing the fuel electrode.

In particular exemplary embodiments explained in detail hereinafter, the solid oxide cell (SOC) of this invention functions in forward direction as a solid oxide fuel cell (SOFC), or functions in reverse direction as a solid oxide electrolysis cell (SOEC), or functions in both forward and reverse directions dually as a combined SOFC-SOEC.

In one exemplary embodiment, this invention provides for a solid oxide fuel cell (SOFC) having a reformer integrated therein, comprising components disposed in a sandwich configuration in the following order:
(i) an oxygen electrode,
(ii) a solid oxide electrolyte,
(iii) a fuel electrode,
(iv) a fuel manifold, and
(v) a reformer comprising at least one layer of mesh having a reforming catalyst supported thereon, the at least one layer of mesh disposed in at least one of the following configurations:
(1) disposed on at least a portion of the fuel manifold, on a side of the fuel manifold facing the fuel electrode; and
(2) disposed as a fifth aspect of the sandwich configuration adjacent to the fuel manifold, on a side of the fuel manifold opposite a side facing the fuel electrode.

In a related aspect, this invention provides for a method of generating electricity in the aforementioned solid oxide fuel cell (SOFC) having a reformer integrated therein, comprising:
(a) providing a solid oxide fuel cell comprising components disposed in a sandwich configuration in the following order:
(i) an oxygen electrode,
(ii) a solid oxide electrolyte,
(iii) a fuel electrode,
(iv) a fuel manifold,
(v) a reformer comprising at least one layer of mesh having a reforming catalyst supported thereon, the at least one layer of mesh disposed in at least one of the following configurations:
(1) disposed on at least a portion of the fuel manifold, on a side of the fuel manifold facing the fuel electrode; and
(2) disposed as a fifth aspect of the sandwich configuration adjacent the fuel manifold, on a side of the fuel manifold opposite a side facing the fuel electrode;
(b) contacting oxygen with the oxygen electrode under conditions sufficient to produce oxide ions, the oxide ions diffusing from the oxygen electrode through the solid oxide electrolyte to the fuel electrode;
(c) at the reformer contacting a gaseous hydrocarbon fuel with steam, or with an oxidant, or with both steam and an oxidant, in the presence of the reforming catalyst, the contacting occurring under reaction conditions sufficient to produce a gaseous reformate comprising hydrogen and carbon monoxide;

(d) distributing the reformate through the fuel manifold; and (e) contacting the reformate with the oxide ions at the fuel electrode under reaction conditions sufficient to produce water, carbon dioxide, or a mixture thereof, and an electrical current.

The solid oxide fuel cell of this invention provides a combination of benefits not found heretofore in the prior art. First, the fuel cell of this invention avoids a need for an external reformer and associated balance of plant components including an external heat exchanger, thereby reducing weight, dimensions, and complexity that such external components add to the fuel cell stack assembly. Second, whereas prior art internal reforming designs dispose the reforming catalyst as a particulate bed adjacent to the fuel electrode or as a coating bonded to or a solid dispersed within the fuel electrode or fuel interconnect; in contrast, the solid oxide fuel cell of this invention disposes the reformer as a separate catalytic layer of mesh on or adjacent to the fuel manifold. In contrast to prior art designs, the invention is advantageously tailored to provide for simplified manufacture and uniformity of temperature throughout the cell repeat unit and stack assembly. Moreover, the mesh structure of the invention in a metal and/or otherwise electrically conductive embodiment provides rapid heat input for start-up of the fuel cell through resistive heating or through the exothermic reforming process (CPOX/ATR). Likewise, the mesh provides for effective heat removal during steady state operation via the endothermic reforming process (SR). Active cooling of the fuel electrode via the reforming reaction occurring in the mesh adjacent to the fuel electrode also reduces the required heat removal rate (namely, the rate of oxygen or air flow at the oxygen electrode) resulting in increased system efficiency and reduced parasitic losses. These advantages aid in reducing thermal stress and moderating the temperature of the SOC, which leads to longer SOC lifetime.

More to the point, the reformer employed in this invention, comprising the mesh having supported thereon a reforming catalyst, has demonstrated resistance to carbon formation during steam or partial oxidation reforming of gaseous hydrocarbons. The mesh's low thermal mass provides for a substantially uniform temperature profile and avoidance of carbon-producing cold spots within the reformer. Finally, enhanced geometric and specific surface areas of the mesh promote improved conversion of reactants. In comparison to feeding pure hydrogen or methane directly to the fuel cell, this invention relies on feeding hydrogen and carbon monoxide produced in the embedded reformer, resulting in an increased power density and higher fuel utilization per fuel cell repeat unit. Moreover, the reformer is adaptable to either endothermic steam reforming (SR), exothermic catalytic partial oxidation (CPOX), or autothermal reforming (ATR), as desired.

If desired, this invention provides a water neutral apparatus and process, in that the water produced during fuel cell operation can be cycled to the reformer and utilized in the steam reforming process. The subject invention also readily allows for fuel exhaust recycle to the fuel electrode, if desired, while minimizing interference with current collection and flow distributors and manifolds. The design is adaptable to solid oxide stacks from various manufacturers.

In another exemplary embodiment, this invention provides for a solid oxide electrolysis cell (SOEC) having a heater integrated therein, comprising components disposed in a sandwich configuration in the following order:

(i) an oxygen electrode,
(ii) a solid oxide electrolyte,
(iii) a fuel electrode,
(iv) a fuel manifold,
(v) an insulator, and
(vi) a heater comprising at least one layer of mesh absent a catalyst, the heater disposed adjacent to the insulator on a side of the insulator opposite a side facing the fuel manifold.

In a related aspect, this invention provides for a process of electrolyzing a fuel in the aforementioned solid oxide electrolysis cell (SOEC) having a heater integrated therein, comprising:

(a) providing a solid oxide electrolysis cell comprising a sandwich configuration in the following order:
(i) an oxygen electrode,
(ii) a solid oxide electrolyte,
(iii) a fuel electrode,
(iv) a fuel manifold,
(v) an insulator, and
(vi) a heater comprising at least one layer of mesh absent a catalyst, the heater disposed adjacent to the insulator on a side of the insulator opposite a side facing the fuel manifold;

(b) resistively heating the at least one layer of mesh and thereby providing heat to the fuel electrode;

(c) feeding a fuel through the fuel manifold and contacting the fuel and a supply of electrons at the fuel electrode under reaction conditions sufficient to produce a reduced chemical product and oxide ions, the oxide ions migrating from the fuel electrode through the solid oxide electrolyte to the oxygen electrode; and (d) contacting the oxide ions with the oxygen electrode under conditions sufficient to produce molecular oxygen.

The aforementioned electrolysis cell and process provide for a rapid input of heat to each individual solid oxide cell with temperature uniformity, so as to drive the endothermic electrolysis. The cell design minimizes interference with current collection and flow distributors and manifolds and is readily adaptable to SOC stacks from various manufacturers.

DRAWINGS

FIG. 6 depicts an embodiment of an integrated heater-solid oxide electrolysis cell of this invention.

FIG. 7 depicts an embodiment of a solid oxide cell of this invention, particularly of one repeat unit capable of regenerative operation.

DETAILED DESCRIPTION OF THE INVENTION

Figure 1:
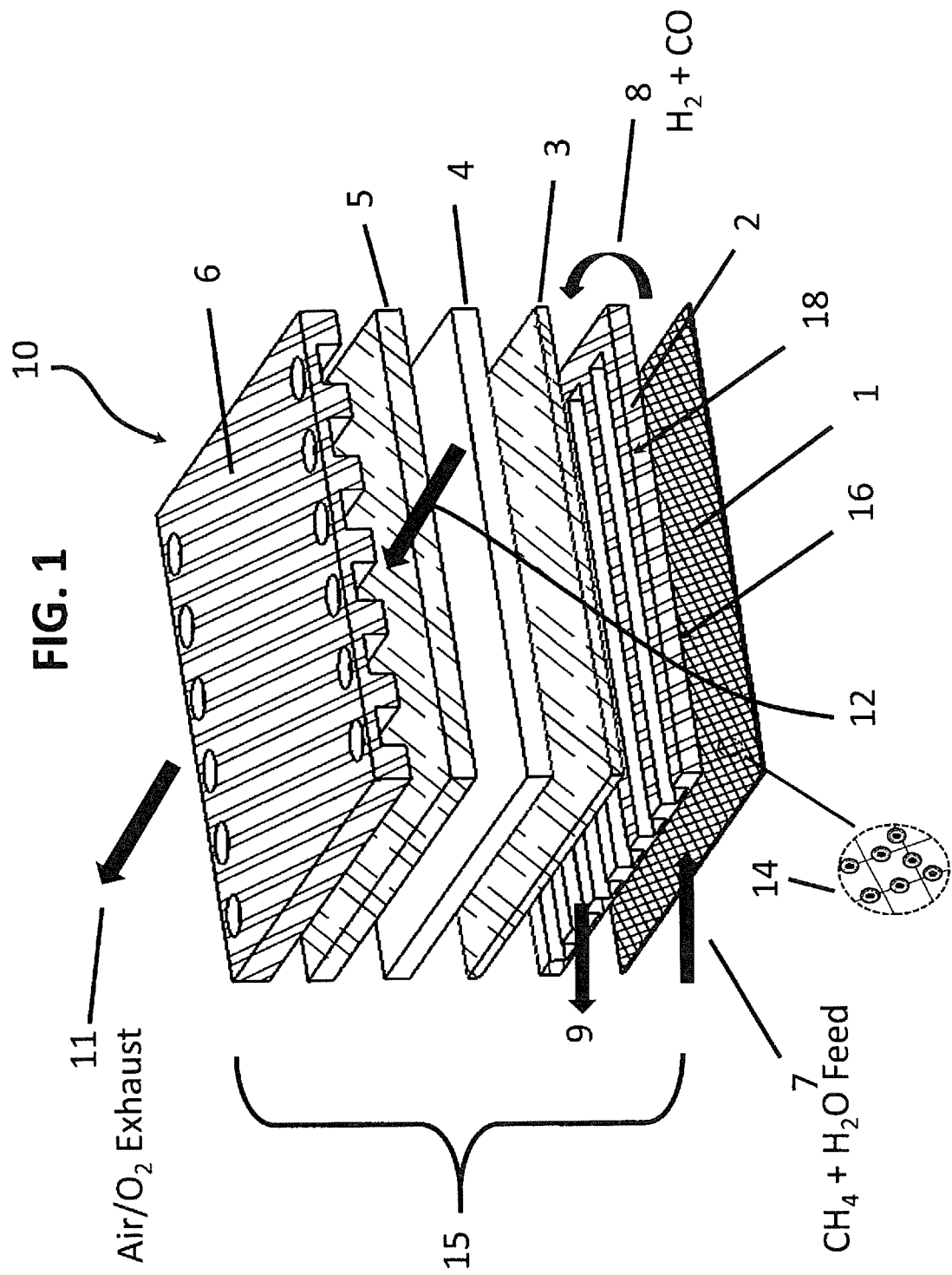
FIG. 1 depicts an embodiment of an integrated reformer-solid oxide fuel cell of this invention, specifically, of one repeat unit showing a flow path through the SOFC with an internal reforming section.

In basic concept, the solid oxide cell (SOC) described herein is capable of functioning in forward direction as a solid oxide fuel cell (SOFC) and in reverse direction as a solid oxide electrolysis cell (SOEC). Each solid oxide cell, which is typically repeated multiple times in each fuel cell stack, comprises a sandwich configuration in the following order:
  (i) an oxygen electrode,
  (ii) a solid oxide electrolyte,
  (iii) a fuel electrode,
  (iv) a fuel manifold; and
  (v) at least one layer of mesh disposed adjacent to the fuel manifold, on a side of the fuel manifold opposite a side facing the fuel electrode.

In one exemplary embodiment, the at least one layer of mesh supports a reforming catalyst capable of either steam reforming (SR), catalytic partial oxidation (CPOX), or autothermal reforming (ATR). In this embodiment, the at least one layer of mesh having the reforming catalyst supported thereon provides for a reformer integrated into each SOC repeat unit in the stack. The resulting repeat unit and fuel cell stack convert a gaseous hydrocarbon, such as methane, into a gaseous reformate comprising hydrogen and carbon monoxide, and thereafter convert the reformate and a supply of oxygen into oxidized chemical products, respectively, water and carbon dioxide, and a usable DC electrical current.

In another exemplary embodiment, an electrical insulator configured, for example, as a gasket or frame is additionally disposed between the fuel manifold and the at least one layer of mesh. In another exemplary embodiment, the electrical insulator and the at least one layer of mesh are combined into one composite piece by coating the insulator onto the at least one layer of mesh. In these embodiments, the mesh does not support a reforming catalyst. The resulting embodiments function as an electrolysis cell (SOEC), which is capable of electrolyzing water, carbon dioxide or a mixture thereof at the fuel electrode to their related reduced products, respectively, hydrogen, carbon monoxide or a mixture thereof. Oxygen is produced as a coproduct at the oxygen electrode.

In yet another exemplary embodiment, the solid oxide cell comprising the at least one layer of mesh comprises a reforming catalyst supported thereon and further comprises an electrical insulator configured, for example, as a gasket or frame disposed between the fuel manifold and the at least one layer of mesh. In this embodiment, the resulting solid oxide cell provides dual or regenerative functionality, in forward direction as a solid oxide fuel cell (SOFC) and in reverse direction as a solid oxide electrolysis cell (SOEC). In this dual-functional embodiment, the solid oxide cell comprises a sandwich configuration having components in the following order:
  (i) an oxygen electrode,
  (ii) a solid oxide electrolyte,
  (iii) a fuel electrode,
  (iv) a fuel manifold,
  (v) an insulator and
  (vi) a dual reformer-heater comprising at least one layer of mesh having a reforming catalyst supported thereon; the at least one layer of mesh disposed adjacent to the insulator on a side of the insulator opposite a side facing the fuel manifold.

In yet another embodiment, a plurality of any one of the aforementioned solid oxide cells of this invention, i.e., individual repeat units, are connected in series to assemble a solid oxide stack. In another embodiment, the solid oxide stack is comprised of at least one of the aforementioned solid oxide cells of this invention and at least one of any conventional solid oxide cells. In another embodiment, a plurality of such stacks is assembled into a larger solid oxide cell system.

With reference to FIG. 1, an embodiment of this invention (10) of a single solid oxide cell (cell repeat unit) (15) having a reformer integrated therein is depicted, which comprises in sandwich configuration the following components: an oxygen interconnect (6), an oxygen electrode (5), a solid oxide electrolyte (4), a fuel electrode (3), a fuel manifold (2), and a reformer comprising at least one layer of mesh (1) having a reforming catalyst (14) supported thereon. As depicted in FIG. 1, the fuel manifold (2), also functioning as a fuel interconnect or fuel bipolar plate, is formed of a solid material provided with a flat surface on a side (16) facing the at least one layer of mesh (1) and further provided with a series of grooves and channels on an opposite side (18) facing the fuel electrode (3). The grooves and channels function to direct and distribute a flow of fuel to contact the fuel electrode (3). Likewise, the oxygen interconnect (6) also functions as an oxygen manifold by construction as a solid plate having a series of grooves and channels on a side facing the oxygen electrode (5), for directing and distributing a flow of oxidant to contact the oxygen electrode (5) and out of the cell. In the embodiment depicted in FIG. 1, the grooves and channels of the fuel manifold (2) provide for a reformate flow (8, 9) in transverse or cross-wise direction with respect to the flow of oxygen (12, 11) as provided by the grooves and channels in the oxygen interconnect (6). It should be appreciated that the fuel and oxygen manifolds are not limited to flow designs consisting of grooves and channels; but may provide a variety of other operable flow patterns. Alternative flow designs include, for example, holes, pores, reticulated nets, and any combination thereof including with the aforementioned grooves and channels.

In terms of SOFC operation, a flow (7) of steam and a gaseous hydrocarbon fuel, e.g. methane, are fed through the reformer comprising the at least one layer of catalytic mesh (1) where the hydrocarbon is steam reformed to produce a gaseous reformate (8) comprising hydrogen and carbon monoxide. The gaseous reformate (8) exiting the mesh reformer (1) is rerouted through the fuel manifold (2), which in in the embodiment of FIG. 1 consists of a plurality of flow channels and grooves where the reformate contacts the fuel electrode (3), such that hydrogen and carbon monoxide are reacted with oxide ions to form water and carbon dioxide, which exit with any unconverted reformate via fuel exhaust flow (9). During the oxidation reaction, electrons are released into an external electrical circuit (not shown) connecting fuel electrode (3) with oxygen electrode (5). Electrons migrate through the external electrical circuit to the oxygen electrode (5) and during transit are capable of producing electrical work. At the oxygen electrode (5), a flow of oxygen or air (12) is fed into the grooves and channels of the oxygen interconnect (6), where the oxygen is contacted with and reduced at the oxygen electrode (5) to produce oxide ions. The oxide ions migrate from the oxygen electrode (5) through the solid oxide electrolyte (4) to the fuel electrode (3) to complete the electrochemical reaction. Unconverted oxygen or air exits via flow (11) at the exit side of the channels of the oxygen interconnect (6).

Figure 2:
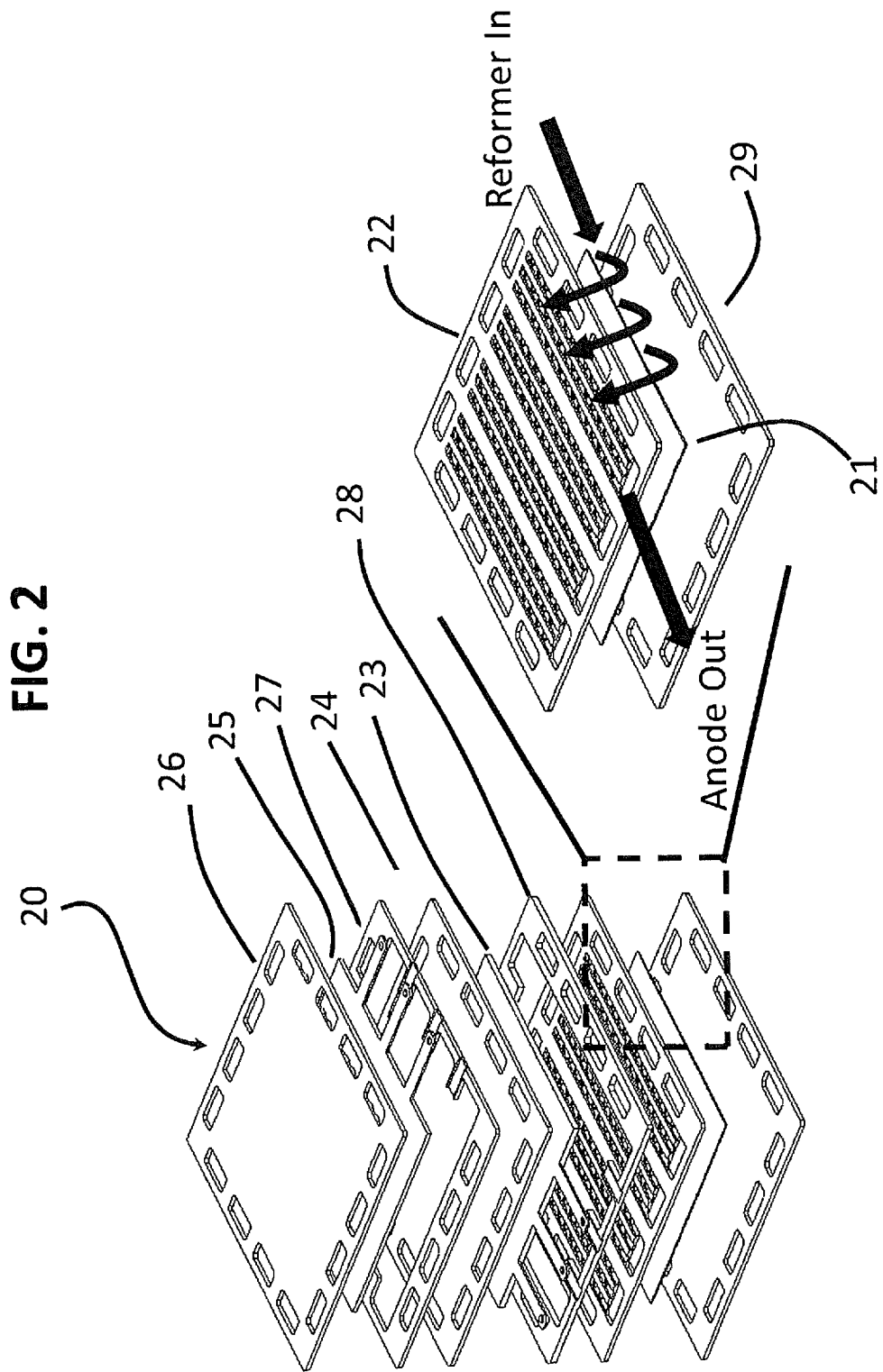
FIG. 2 depicts another embodiment of an integrated reformer-solid oxide fuel cell of this invention.

FIG. 2 depicts another embodiment of this invention (20) comprising the integrated reformer-solid oxide fuel cell of one repeat unit, plus an oxygen interconnect from the next repeat unit. Here, a sandwich construction is provided with components in the following order an oxygen interconnect (26), an oxygen electrode (25), an oxygen-side gasket (27), a solid oxide electrolyte (24), a fuel electrode (23), a fuel-side gasket (28), a fuel manifold (functioning also as fuel interconnect) (22) a reformer comprising at least one layer of mesh (21) having a reforming catalyst bonded thereon, and the oxygen interconnect (29) from the adjacent to fuel cell unit. As seen in FIG. 2, the mesh reformer (21) is disposed on the side of the fuel manifold (22) opposite the side facing the fuel electrode (23). In FIG. 2, for clarity of illustration, the reformer (21) is depicted as a layer without cross-hatching and catalyst; nevertheless, it should be appreciated that the reformer comprises the aforementioned catalytic mesh similar to the embodiment shown in FIG. 1 (1). (The same applies to FIGS. 3-5.) As compared with FIG. 1 where the fuel manifold (2) is constructed with grooves and channels for directing the flow of reformate into contact with the fuel electrode (3), in the embodiment of FIG. 2, the fuel manifold (22) comprises a series of pores and holes for directing the flow of reformate into contact with the fuel electrode (23). Gaskets (28, 27) provide seals that ensure that essentially all of the appropriate gaseous flows pass into contact with the fuel and oxygen electrodes (23, 25), respectively.

Figure 3:
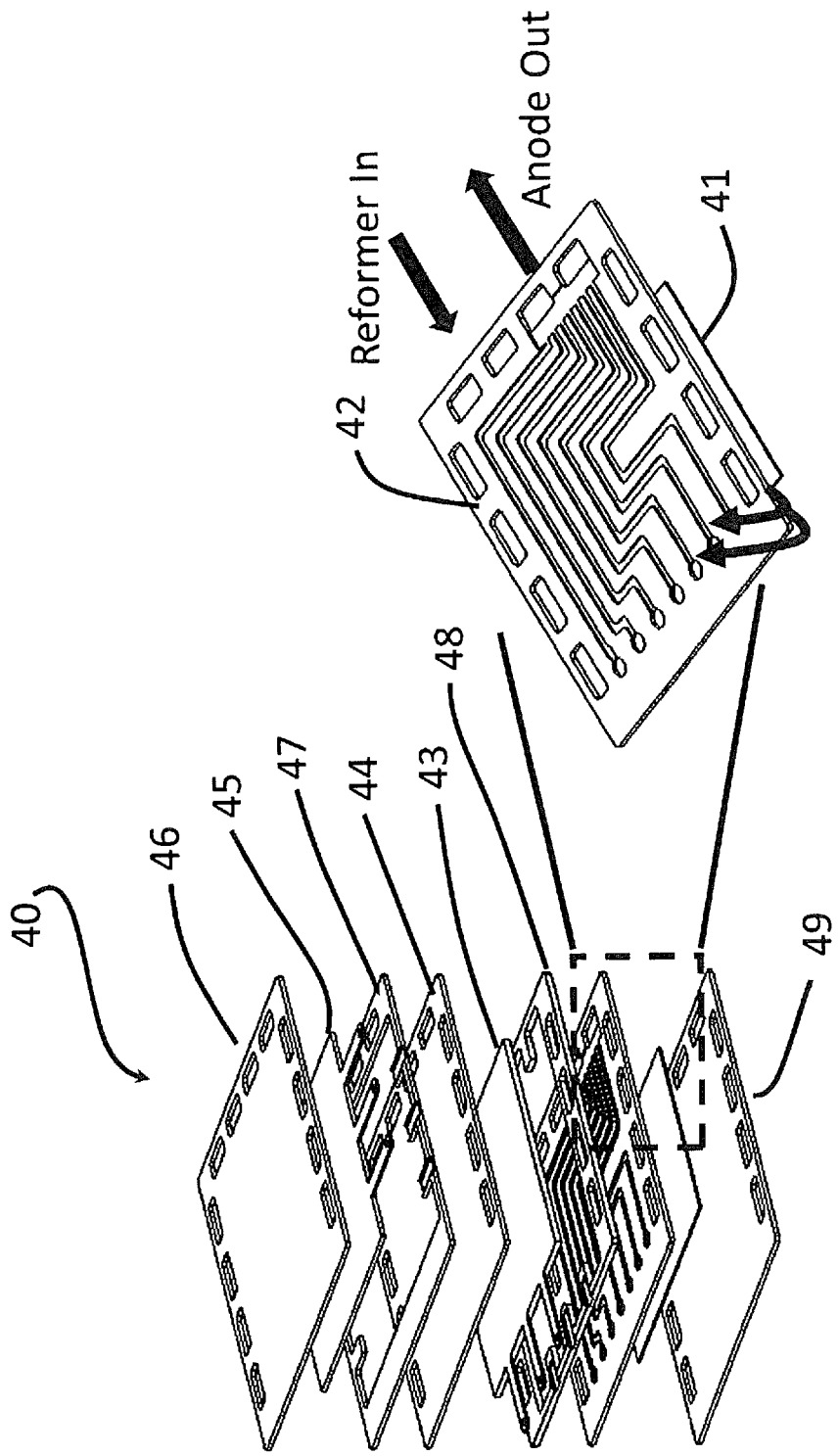
FIG. 3 depicts another embodiment of an integrated reformer-solid oxide fuel cell of this invention.

FIG. 3 depicts another embodiment of this invention (40) comprising an integrated reformer-solid oxide fuel cell of one repeat unit plus an oxygen interconnect from the next repeat unit. Here again, a sandwich construction is provided in the following order an oxygen interconnect (46), an oxygen electrode (45), an oxygen-side gasket (47), a solid oxide electrolyte (44), a fuel electrode (43), a fuel-side gasket (48), a fuel manifold (also functioning as the fuel interconnect) (42), a reformer comprising at least one layer of mesh (41) having a reforming catalyst supported thereon, plus an oxygen interconnect (49) from the adjacent to fuel cell unit. As seen in FIG. 3, the mesh reformer (41) is disposed on the side of the fuel manifold (42) opposite the side facing the fuel electrode (43). In this embodiment, the fuel manifold (42) is modified such that the reformer inlet and the fuel electrode outlet (anode outlet) are disposed on the same side/plane, which is a variation of the design shown in FIG. 1. The gas distribution is made uniform by altering the channels design within the fuel manifold (42). Gaskets (48, 47) provide seals that ensure that essentially all relevant gaseous flows pass into contact with the fuel and oxygen electrodes (43, 45), respectively.

Figure 4:
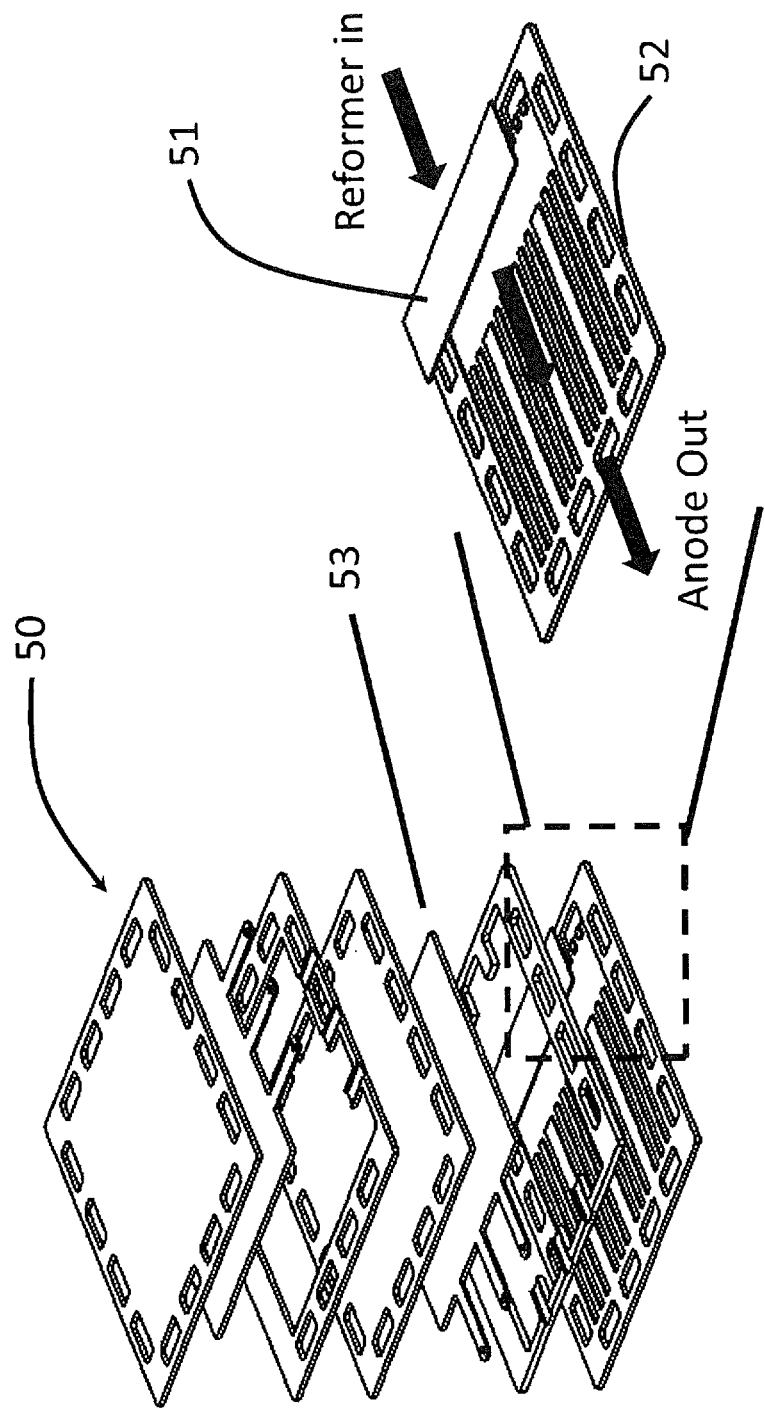
FIG. 4 depicts another embodiment of an integrated reformer-solid oxide fuel cell of this invention

FIG. 4 illustrates yet another embodiment of the invention (50) wherein the reformer comprising the at least one layer of mesh (51) having the reforming catalyst supported thereon, is disposed along a leading edge of the fuel manifold (52) on a side of the fuel manifold (52) facing the fuel electrode (53). The term "leading edge" refers to the edge of the fuel manifold at an inlet to the flow path, as depicted by an arrow in FIG. 4.

Figure 5:
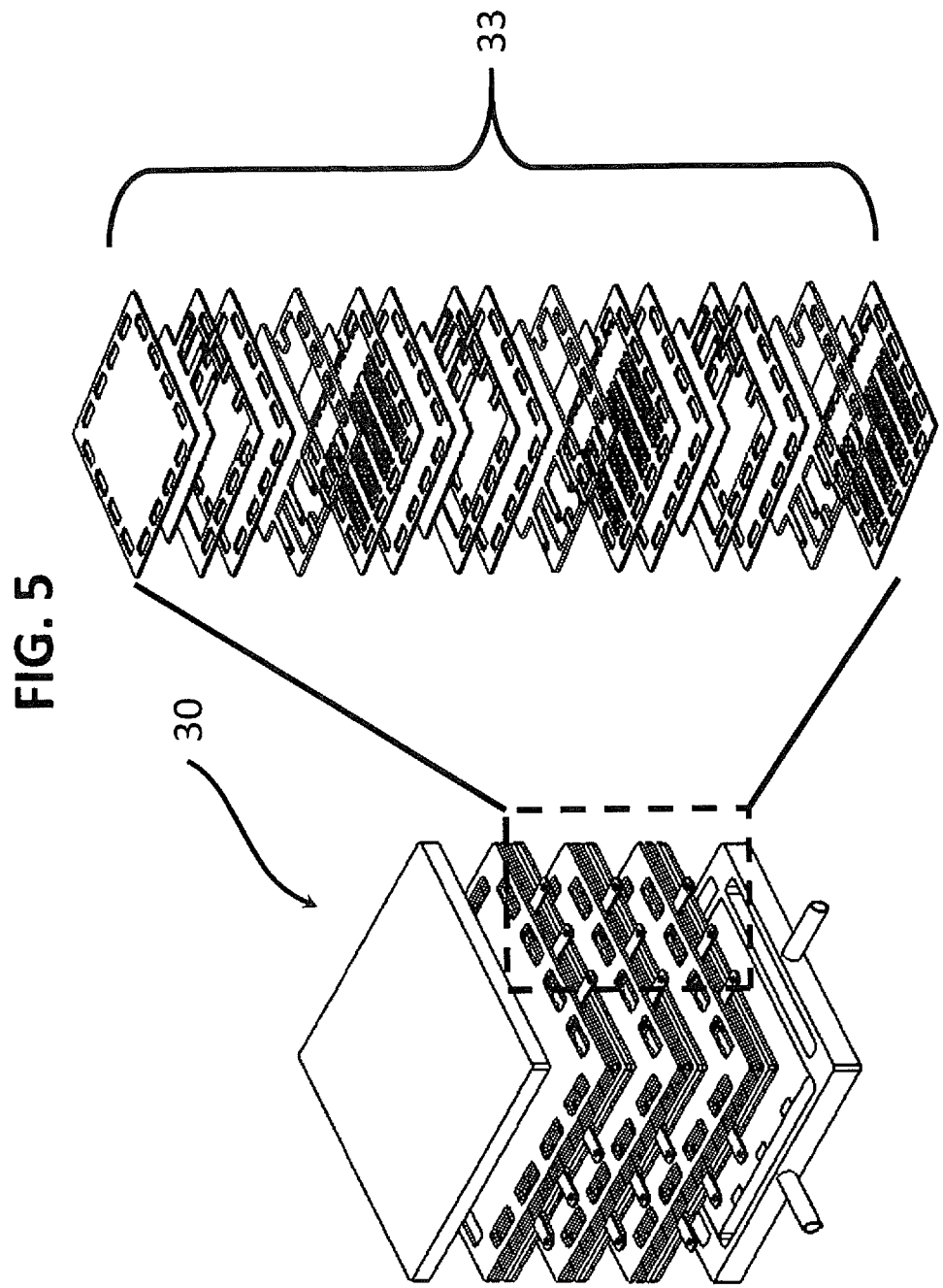
FIG. 5 depicts a stack assembly comprising a plurality of repeat units comprising the integrated reformer-solid oxide fuel cell of the embodiment shown in FIG. 4.

FIG. 5 depicts an embodiment of this invention (30) comprising a stack (33) constructed from a plurality of integrated reformer-solid oxide cell units, each unit configured as described hereinabove in FIG. 4.

FIG. 6 depicts an exemplary embodiment (60) of this invention of a single solid oxide cell integrated with a heater, which functions in SOEC mode. Model (60) comprises in sandwich configuration the following components: an oxygen interconnect (66), an oxygen electrode (65), a solid oxide electrolyte (64), a fuel electrode (63), a fuel manifold (62), also functioning as the fuel interconnect or fuel bipolar plate, a first electrical insulator gasket or frame (68), a heater (61) comprising at least one layer of mesh, preferably a metal mesh, and a second electrical insulator (94) disposed on a side of the mesh (61) opposite a side facing the first electrical insulator (68). In this embodiment, no catalyst is supported on the mesh. As depicted in FIG. 6, the fuel manifold (62) is formed of a solid material configured with a flat surface on a side facing the first insulator (68) and heater (61), and further configured with a series of grooves and channels on an opposite side facing the fuel electrode (63), the groves and channels for directing and distributing a flow (70) of fuel across the fuel electrode (63) exiting as flow (90). Likewise, the oxygen interconnect (66) is constructed as a solid plate configured with a series of grooves and channels on a side facing the oxygen electrode (65) for directing and distributing a flow (92) of oxygen and optional sweep gas, such as air, through the oxygen interconnect (66) and then exiting the cell as flow (91).

In terms of SOEC operation, the heater (61) comprising the at least one layer of mesh is heated resistively to provide heat to the cell. The insulator gasket (68) provides electrical insulation between the mesh (61) and the electrically conductive fuel manifold (62). A flow of fuel (70), specifically carbon dioxide or water or a mixture thereof, is fed into the fuel manifold (62), where the fuel contacts the fuel electrode (63) and is electrochemically reduced via input of electrons derived from the electrical circuit to form oxide ions ($O^{2-}$) and a second chemical product. The second chemical product, which is hydrogen when the fuel is water, or carbon monoxide when the fuel is carbon dioxide, exits the channels of the fuel manifold (62) via exit flow path (90). The oxide ions migrate from the fuel electrode (63) through the solid oxide electrolyte (64) to the oxygen electrode (65). At the oxygen electrode (65), the oxide ions are converted to oxygen which is swept, typically with a flow (92) of a sweep gas, such as air or oxygen or steam, through the channels of the oxygen interconnect (66), exiting as flow (91). The electrons collected at the oxygen electrode (65) travel via the external electrical circuit (not shown) to the fuel electrode (63) where they are consumed to complete the electrolysis reaction.

FIG. 7 depicts an embodiment of the SOC of this invention capable of regenerative operation, wherein solid oxide cell (60) of FIG. 6 having components described hereinabove further comprises a reforming catalyst (14) supported on the mesh (61), preferably herein a metal mesh, thereby providing dual-functional heating and reforming. When all or a portion of the at least one layer of mesh (61) supports a reforming catalyst, the cell is capable of operating in forward direction as a SOFC and reverse direction as SOEC. In this embodiment in SOFC operation, the fuel flow (72) is directed towards the reforming catalyst, and the reformate exiting as flow (78) is redirected through the fuel manifold (62), as seen in FIG. 7. This dual functional form of operation is known as "regenerative" mode.

The aforementioned embodiments of this invention are depicted in the Drawings herein as having a sandwich configuration of planar sheets. Other geometries may be suitable including wherein the planar sheets have a defined curvature. Generally, it is optimal for each layer in the sandwich configuration to have essentially identical outer dimensions and surface geometry, so that the layers of the sandwich fit uniformly against each other for thermal and chemical efficiencies.

Regarding materials of construction, the mesh provides a variety of useful functions in thin, compact, light-weight sheets. In one aspect, the mesh functions as a catalyst substrate. For this function, a steam reforming (SR) or catalytic partial oxidation (CPOX) or autothermal reforming (ATR) catalyst is supported on the mesh such that the resulting catalytic mesh is capable of converting a gaseous hydrocarbon in the presence of steam and/or an oxidant into a gaseous reformate comprising hydrogen and carbon monoxide. In another aspect, the mesh as provided in a metallic or otherwise electrically conductive embodiment functions as a resistive heating element that rapidly transmits heat with substantial uniformity across the mesh to start-up the reformer for SOFC operation as well as to provide heat for operation under stand-by or low load operations. Accordingly, in one embodiment, an external burner, which is capable of combusting a burner gas, such as hydrogen, carbon monoxide, or methane, to generate heat for start-up of the SOFC, is not necessary and is eliminated. During steady state operation of the SOFC, no further resistive heating is required, and the cell produces an exotherm from the electrochemical reaction. In yet another aspect, when the anode/fuel electrode tail gas is recycled to the reformer, the SOFC system of this invention further minimizes the duty for an external burner to provide heat required for the recycling operation. In SOEC mode the conductive mesh provides a continuous input of heat via electrical resistive heating for endothermic electrolysis reactions.

Each layer of mesh employed in this invention resembles a two-dimensional reticulated screen or net comprising a plurality of void spaces ("cells"), with a third dimension comprising an ultra-short-channel-length flow path, which in one embodiment is equal to or not much longer than the diameter of the elements from which the mesh is made. For the purposes of this invention, the term "ultra-short-channel-length" refers to channel lengths in a range from about 25 microns (μm) (0.001 inch) to about 500 μm (0.02 inch). In one exemplary embodiment, the ultra-short-channel-length ranges from about 50 μm (0.002 inch) to about 150 μm (0.006 inch). In contrast, prior art monoliths represent three-dimensional structures having long flow paths or channels running there through, such long channels referring to a channel length greater than about 1 mm (0.039 inch), and often greater than about 5 mm (0.20 inch).

More specifically, each layer of mesh in this invention typically is configured with a plurality of channels or pores having a diameter ranging from about 0.25 millimeters (mm) to about 1.0 mm, with a void space greater than about 60 percent, preferably up to about 80 percent or more. A ratio of channel length to diameter is generally less than about 2:1, preferably less than about 1:1, and more preferably, less than about 0.5:1. Preferably, the ultra-short-channel-length mesh has a cell density ranging from about 100 to about 1,000 cells or flow paths per square centimeter.

In terms of materials of construction, the layers of mesh can be selected each individually from metals, non-metals, such as ceramics, and mixtures of ceramics and metals including cermets. The choice of mesh is tailored to the application. For SOFC operation solely, the layers of mesh are not-restricted, and any of metals, ceramics, and mixtures thereof are suitable. For SOEC operation solely, the layers of mesh are each individually constructed from metals or analogous electrically-conductive materials capable of providing for resistive heating. For regenerative operation in both SOFC and SOEC modes, the layers of mesh are each individually constructed from metals or analogous electrically-conductive materials capable of providing resistive heating. The mesh is not limited by any method of manufacture; for example, meshes can be constructed via weaving or welding fibers, or by an expanded metal technique as disclosed in U.S. Pat. No. 6,156,444, incorporated herein by reference, or by 3-D printing, or by a lost polymer skeleton method.

In more specific exemplary embodiments, the metal mesh is constructed from any conductive metal or combination of metals provided that the resulting structure is capable of withstanding the temperatures and chemical environment to which it is exposed. Suitable non-limiting materials of construction for the metal mesh include iron-chromium alloys, iron-chromium-aluminum alloys, and iron-chromium-nickel alloys. Such metal meshes are available commercially, for example, from Alpha Aesar and Petro Wire & Steel. In one embodiment, the metal mesh comprises a Microlith® brand metal mesh obtainable from Precision Combustion, Inc., of North Haven, Conn., USA. As described in U.S. Pat. Nos. 5,051,241 and 6,156,444, incorporated herein by reference, Microlith® brand mesh technology offers a unique design combining an ultra-short-channel-length with low thermal mass in one monolith, which contrasts with prior art monoliths having substantially longer channel lengths as noted hereinabove.

The term "ceramic" refers to inorganic non-metallic solid materials with a prevalent covalent bond, including but not limited to metallic oxides, such as oxides of aluminum, silicon, magnesium, zirconium, titanium, niobium, and chromium, as well as zeolites and titanates. Reference is made to U.S. Pat. Nos. 6,328,936 and 7,141,092, detailing insulating layers of ultra-short-channel-length ceramic mesh comprising woven silica, both patents incorporated herein by reference. The term "cermet" refers to a composite material comprising a ceramic in combination with a metal, the composite being typically conductive while also exhibiting a high resistance to temperature, corrosion, and abrasion in a manner similar to ceramic materials.

As compared with prior art monoliths, the mesh having the ultra-short-channel-length facilitates packing more active surface area into a smaller volume and provides increased reactive area for a given pressure drop. Whereas in prior art honeycomb monoliths having conventional long channels, a fully developed boundary layer is present over a considerable length of the channels; in contrast, the ultra-short-channel-length characteristic of the mesh useful for this invention avoids boundary layer buildup. Since heat and mass transfer coefficients depend on boundary layer thickness, avoiding boundary layer buildup enhances transport properties. The advantages of employing the mesh having the ultra-short-channel-length, and preferably, the Microlith® brand thereof, to control and limit the development of a boundary layer of a fluid passing there through is described in U.S. Pat. No. 7,504,047, which is a Continuation-In-Part of U.S. Pat. No. 6,746,657, both patents incorporated herein by reference.

In another exemplary embodiment, the mesh is constructed of an analogous structure of metal, ceramic, or other manufactured or structured ultra-short-channel-length substrate material comprising an interconnected network of solid struts defining a plurality of pores of an open-cell configuration. The pores can have any shape or diameter; but typically, a number of pores that subtend one inch designates a "pore size," which for most purposes ranges from about 5 to about 80 pores per inch. The relative density of such structures, taken as the density of the structure divided by the density of solid parent material of the struts, typically ranges from about 2 to about 15 percent. Manufactured or structured ultra-short-channel-length substrates are commercially available in a variety of materials capable of withstanding the operating temperatures of the SOFC and SOEC of this invention.

In the solid oxide cell of this invention, it is desirable to employ from 1 to about 10 layers of mesh per SOC repeat unit. In another embodiment, from 1 to about 4 layers of mesh are employed per SOC repeat unit. It should be appreciated that when present, the reforming catalyst in one embodiment is applied to each layer of mesh. Alternatively, in another embodiment the reforming catalyst is applied to at least one but not all of the mesh layers present. As an example, it is possible to use 3 layers of mesh, wherein the middle layer is coated with a reforming catalyst, while the top and bottom layers are not.

In another exemplary embodiment, the loading of the reforming catalyst on the mesh is varied along the length of the mesh layer in the direction of fuel flow, thereby providing a catalyst concentration gradient along the direction of fuel flow. In yet another embodiment, the catalyst is loaded onto the mesh in a predetermined pattern sufficient to provide a predetermined thermal gradient across the mesh under reforming conditions. Both of these embodiments provide a method of controlling temperature during the reforming process while minimizing thermal stresses on the solid oxide cell. More specifically, in one embodiment, the loading of the reforming catalyst increases along the length of the mesh in the direction of fuel flow. In another embodiment, the loading of the reforming catalyst increases from an inlet of the fuel flow to a maximum at about a mid-point of the length of the mesh in the direction of fuel flow, and then decreases from the mid-point to the end of the mesh at the outlet of the fuel flow.

The disposition of the mesh in each fuel cell repeat unit is envisioned in several different embodiments. In one embodiment, the mesh is provided on at least a portion of the fuel manifold on a side of the fuel manifold facing the fuel electrode. One way to implement this embodiment involves positioning the mesh in at least one layer at the leading edge of the fuel manifold. The term "leading edge" refers to an inlet edge of the flow manifold where fuel is fed into the manifold. In contrast, the term "trailing edge" refers to an exit edge of the fuel manifold where product gases exit the SOC. Another embodiment involves positioning the mesh in and along channels or grooves of the fuel manifold. As an example, strips of mesh can be disposed in at least a portion of the channels and grooves of the fuel manifold, preferably along the length of the channels and grooves from the leading edge to the trailing edge. There is no limitation on the manner in which the layer(s) of mesh are disposed on the fuel manifold. Many other operable embodiments can be envisioned besides those mentioned hereinabove.

In another embodiment, at least one layer of mesh is positioned adjacent to the fuel manifold, on a side of the fuel manifold opposite a side facing the fuel electrode. In another embodiment, at least one layer of mesh is positioned adjacent to an electrical insulator, which itself is positioned adjacent to the fuel manifold. Both the electrical insulator and the mesh am disposed on a side of the fuel manifold opposite a side of the fuel manifold facing the fuel electrode.

Any catalyst capable of converting a hydrocarbon fuel, either by steam reforming (SR), or catalytic partial oxidation (CPOX), or autothermal reforming (ATR) into a gaseous mixture comprising hydrogen and carbon monoxide (synthesis gas) is suitably supported for catalytic purposes on the mesh, particularly, by coating the catalyst onto the mesh. Such catalysts include at least one metal selected from Group VIII metals of the Periodic Table, including iron, cobalt, nickel, ruthenium, rhodium, palladium, osmium, iridium, platinum, and combinations thereof. Preferably, the catalyst is selected from the platinum group metals (PGM) including ruthenium, rhodium, palladium, osmium, iridium, platinum, and combinations thereof. In one embodiment, the catalyst is supported on an oxide washcoat, suitable non-limiting species of which include titania ($TiO_2$, e.g., anatase and rutile phases), silica ($SiO_2$), magnesia (MgO), alumina ($Al_2O_3$), zirconia ($ZrO_2$ and mixtures thereof. The catalyst, with or without the oxide washcoat, is bound to the mesh by any conventional coating preparation method known in the art.

Materials useful for the fuel and oxygen electrodes should be stable at operating temperatures; should have a coefficient of thermal expansion compatible with that of the solid oxide electrolyte; and should be chemically compatible with the solid oxide electrolyte and other materials during fabrication and operation of the solid oxide cell. Functionally, in forward operation, the job of the fuel electrode is to combine the oxide ions that diffuse through the electrolyte with the gaseous reformate fuel supplied to the fuel electrode to produce water and carbon dioxide as well as a flow of electrons. Typically, the fuel electrode is constructed of a porous ceramic layer that allows the gaseous reformate to flow uniformly throughout from inlet to outlet. Since the fuel electrode must be electrically and ionically conductive, the fuel electrode typically comprises a combination of ceramic and metal (cermet) prepared by standard ceramic processing techniques. Non-limiting examples of cermets useful as the fuel electrode include nickel-yttria stabilized zirconia, i.e., Ni—$Y_2O_3$ stabilized $ZrO_2$ (Ni—YSZ), nickel mixed with gadolina doped ceria, Ni—$[(CeO_2)_{0.8}(GdO_2)_{0.02}]$ also written as Ni—$(Ce,Gd)O_2$ or Ni-(GDC), nickel mixed with yttria doped ceria zirconia Ni—$[Y_2O_3—(CeO_2)_{0.7}(ZrO_2)_{0.3}]$ also written as Ni-YDCZ, and nickel mixed with yttria doped zirconia (Ni—Y-stabilized $ZrO_2$) also written as Ni—YSZ. Other suitable fuel electrode materials include strontium vanadium molybdenum oxide ($Sr_2VMoO_{6-\delta}$) and lanthanum strontium manganese chromium oxide (LSCM) $[(La_{0.75}Sr_{0.2})Mn0.5Cr_{0.5}O_3)$.

The solid oxide electrolyte comprises a dense layer of ceramic that conducts oxide ions ($O^{2-}$). As an example of a material from which the solid oxide electrolyte layer can be made, we include yttria-stabilized zirconia (YSZ), scandia-stabilized zirconia (ScSZ), and gadolinium-stabilized ceria (GDC), as well as ceria-based electrolytes of the flourite structure and lanthanum gallate (LSGM) of a perovskite crystalline structure. As newer electrolytes are developed, these may lead to less resistivity problems and improved conductivity of oxide ions, which in turn may lead to more robust and better performing electrolyte layers, any of which may be employed in this invention.

The oxygen electrode should also be porous so as to provide for a uniform flow of oxygen throughout the electrode and should be capable of conducting oxide ions ($O^{2-}$) to the solid oxide electrolyte. As non-limiting examples of a material from which the oxygen electrode can be formed, we include manganese-modified-yttria-stabilized zirconia (Mn—YSZ), lanthanum strontium manganite (LSM), lanthanum strontium ferrite (LSF), $(La,Sr)(Co,Fe)O_3$ and any of the cobalites.

It should be appreciated that this invention is in no way limited by the thickness of any of the layers of the fuel electrode, the solid oxide electrolyte, or the oxygen electrode. The thickness of any layer depends in part on whether the solid oxide cell is "electrode supported" or "electrolyte supported". The term "supported" refers to the layers that provide structural strength to the cell. Other suitable supports include "metal supported" cells. Typically, the greater the reliance on structural strength, the thicker is the layer. Thus, a solid oxide cell may be constructed wherein the fuel or oxygen electrode is thickest and the electrolyte layer is thinnest. Alternatively, a solid oxide cell may be constructed wherein the electrolyte layer is thickest and the fuel and oxygen electrodes are thinner.

Each individual solid oxide cell of this invention produces less than about 1 V under typical operating conditions in SOFC mode, but most SOFC applications require higher voltages. Accordingly, for most practical applications a plurality of individual SOC repeat units of this invention is connected electrically in series to form a stack, so as to obtain a higher voltage required for the application. The stack is constructed by securing each SOC repeat unit between two interconnects that provide strength to the stack and separate the repeat units from each other.

Since the interconnects are exposed at high temperatures to both oxidizing and reducing sides of the fuel cell, the interconnects should be highly stable. Accordingly, the interconnects are comprised of any electrically conductive material that can withstand the thermal and chemical environment to which they am exposed. In one embodiment, the interconnects are constructed of metallic plate or foil, for example, high temperature stainless steels, such as SS446, SS430, AL454, E-Brite, Crofer 22, or iron chromium (FeCr) alloys or nickel chromium (NiCr) alloys. In another embodiment, the interconnects are constructed from cermets (metal doped ceramics) which provide for acceptable thermal stability and electrical conductivity. This invention is not limited to any particular interconnect thickness and materials.

It should be appreciated that the fuel-side interconnect forms an additional layer distinctly different from the mesh layer(s) of this invention supporting the reforming catalyst and functioning as reformer and heater. Accordingly, in any solid oxide stack, there is typically disposed in each SOC at least one layer of mesh in accordance with this invention and at least one layer or constructs of conventional interconnect(s), which based on design may function additionally as a fuel manifold and/or current collector. The current collector may be any electrically conductive material, typically metallic, and preferably, a silver or copper screen.

Since each SOC repeat unit in the stack is sandwiched between two interconnects, gaskets are provided around the edges of each repeat unit to provide for a gas-tight seal. The gaskets are typically made of a ceramic (not doped with metal), or glass, or a rubbery seal.

Other parts, such as separators and insulators, can be formed from any suitable material that can withstand the temperature and chemicals to which the parts are exposed. The electrical insulator, required in certain embodiments of this invention, is formed from any electrically non-conductive material including heat resistant ceramics that are not doped with metals.

In forward SOFC operation, the hydrocarbon fuel fed to the reformer comprises any hydrocarbon that exists in a gaseous state at about 22° C. and about 1 atm (101 kPa) pressure or any liquid hydrocarbon that is readily vaporized and fed as a vapor to the reformer. Non-limiting examples of such gaseous hydrocarbons include methane, natural gas, ethane, propane, butane, biogas, and mixtures thereof. Non-limiting examples of liquid hydrocarbons that are readily vaporized include hexane, octane, gasoline, kerosene, and diesel. If steam reforming (SR) is desired, then a flow of liquid water is disposed in thermal contact with the stack so as to utilize the heat of the stack to produce the required steam, which is then fed with the hydrocarbon gas to the reformer. A molar ratio of steam to carbon in the hydrocarbon fuel (S/C ratio) typically ranges from about 1.5:1 to about 4.0:1 during steady state operation. If the reformer operates as an exothermic process, then a flow of oxidant comprising air or oxygen is supplied with the gaseous hydrocarbon to the reformer, with steam (ATR) or without steam (CPOX). The oxidant additionally may comprise other oxygen-bearing components, such as, carbon dioxide. The relative amount of oxygen atoms in the oxidant to carbon atoms in the gaseous hydrocarbon fuel (O/C ratio), as fed to the reformer, typically ranges from about 0.1:1 to about 1.3:1, but should preferably be "fuel-rich" or higher in atomic carbon content than atomic oxygen content so that little, if any, of the hydrocarbon fuel is converted to carbon dioxide and water. It should be appreciated that when an oxidant is employed, then the apparatus is designed, via O/C ratio or other means, to minimize contact of the oxidant with the fuel electrode, so as to avoid damaging the electrode. In one embodiment the SOFC is started up on a mixture of hydrocarbon fuel, such as methane, and oxygen until a steady state operating temperature is reached, at which time the SOFC is transitioned to steam reforming on a mixture of hydrocarbon fuel and steam. If desired, recycle of the fuel electrode exhaust gas (anode tail gas), optionally, with a small quantity of oxygen can be implemented.

Generally, the SR reformer operates at a temperature close to the temperature of the fuel electrode, that is, typically between about 500° C. and about 1,000° C. CPOX reformers operate at a somewhat higher temperature between about 700° C. and about 1,100° C. The overall pressure of the solid oxide fuel cell ranges typically from about 1 bar (100 kPa) to about 5 bars (500 kPa). In SOFC operation, the weight hourly space velocity of the total gaseous flow to the reformer typically ranges from about 250 liters per hour per gram catalyst (L/h/g-cat) to about 6,000 L/h/g-cat.

In either SR, CPOX or ATR operation, the reformer output to the fuel electrode is a gaseous reformate comprising hydrogen and carbon monoxide (synthesis gas), although a large quantity of nitrogen may be present if air is used as the oxidant. Other byproducts in acceptably small quantities include one or more of carbon dioxide, water, and methane. The mesh reformer employed in this invention produces minimal quantities of unconverted hydrocarbons thereby resulting in minimal coke formation, a longer catalyst lifetime, and less degradation of the reformer and SOC. It should be appreciated that the conversion of the hydrocarbon fuel in the reforming stage is governed by equilibrium concentrations at the operating temperature. Nevertheless, the mesh reformer of this invention is capable of achieving a hydrocarbon conversion efficiency of greater than about 80 percent, and even greater than about 90 percent, relative to an equilibrium efficiency of 100 percent, in one pass through the reformer at operating temperatures of 650° C. or higher. Moreover, the mesh reformer employed in this invention is capable of operating for up to 1,000 hours without any observable degradation in performance of the reforming catalyst. Additionally, the reformer of this invention can be cycled through multiple start-ups and shut-downs without degrading performance.

In SOEC operation, the fuel provided to the fuel electrode comprises water, carbon dioxide, or a mixture thereof. The fuel may contain unreactive components, such as hydrogen. Electrons are provided via an external DC circuit. A sweep gas, such as air or an inert gas including, for example, nitrogen or helium, is typically employed to remove the oxygen produced from the cell. Operating temperatures, pressures, and space velocities are similar to those specified hereinabove for SOFC operation.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A solid oxide cell comprising components disposed in a sandwich configuration in the following order:
   (i) an oxygen electrode,
   (ii) a solid oxide electrolyte,
   (iii) a fuel electrode,
   (iv) a fuel manifold, and
   (v) at least one layer of mesh disposed on a side of the fuel manifold opposite a side facing the fuel electrode.

2. The solid oxide cell of claim 1 wherein the at least one layer of mesh each individually has an ultra-short-channel-length ranging from greater than 25 microns to less than 500 microns.

3. The solid oxide cell of claim 1 wherein the at least one layer of mesh comprises a structured material having from 5 to 80 pores per inch and a density ranging from 2 to 15 percent, relative to a density of a parent material from which the structured material is manufactured.

* * * * *